US007983921B2

(12) United States Patent
Hirota et al.

(10) Patent No.: US 7,983,921 B2
(45) Date of Patent: Jul. 19, 2011

(54) INFORMATION PROCESSING APPARATUS FOR SPEECH RECOGNITION WITH USER GUIDANCE, METHOD AND PROGRAM

(75) Inventors: Makoto Hirota, Tokyo (JP); Toshiaki Fukada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 864 days.

(21) Appl. No.: 11/935,862

(22) Filed: Nov. 6, 2007

(65) Prior Publication Data

US 2008/0109223 A1    May 8, 2008

(30) Foreign Application Priority Data

Nov. 8, 2006    (JP) .................................. 2006-303380

(51) Int. Cl.
*G10L 21/00*    (2006.01)
(52) U.S. Cl. ....................................................... 704/270
(58) Field of Classification Search .................. 704/270
See application file for complete search history.

(56) References Cited

U.S. PATENT DOCUMENTS

| 6,336,091 | B1 | 1/2002 | Polikaitis et al. |
| 6,963,841 | B2 * | 11/2005 | Handal et al. .................. 704/270 |
| 7,167,544 | B1 * | 1/2007 | Bauer ......................... 379/88.01 |
| 7,280,964 | B2 * | 10/2007 | Wilson et al. .................. 704/251 |
| 7,502,736 | B2 * | 3/2009 | Hong et al. .................... 704/232 |
| 7,844,458 | B2 * | 11/2010 | Hirota et al. ................... 704/252 |
| 2003/0078784 | A1 * | 4/2003 | Jordan et al. ................... 704/275 |
| 2003/0191629 | A1 * | 10/2003 | Yoshizawa ...................... 704/10 |
| 2008/0120112 | A1 * | 5/2008 | Jordan et al. ................... 704/270 |

* cited by examiner

*Primary Examiner* — Susan McFadden
(74) *Attorney, Agent, or Firm* — Canon U.S.A. Inc., IP Division (57) ABSTRACT

An information processing apparatus whereby advice having appropriate content can be given at an appropriate timing with regard to a method of user utterance, thereby making it possible to reduce the probability of misrecognition due to the method of utterance. An execution unit executes processing that conforms to the result of speech recognition. An analyzing unit analyzes the suitability of input speech for the speech recognition. A cancel instruction unit inputs an instruction to cancel the processing that has been executed by the execution unit. In response to the cancel instruction, a notification unit notifies the user of guidance related to speech input, based upon the result of the analysis unit.

4 Claims, 8 Drawing Sheets

| RESULTS (BY CATEGORY) OF UTTERANCE ANALYSIS | FREQUENCY |
|---|---|
| UTTERANCE TIMING IS TOO EARLY | 5 |
| SPEAK BUTTON RELEASED TOO SOON | 2 |
| VOICE TOO LOUD | 1 |
| VOICE TOO SOFT | 2 |

INFORMATION PROCESSING APPARATUS FOR SPEECH RECOGNITION WITH USER GUIDANCE, METHOD AND PROGRAM

BACKGROUND OF THE INVENTION

1. Field of the Invention

The present invention relates to an information processing apparatus, method and program. More particularly, the invention relates to an information processing apparatus having a speech user interface.

2. Description of the Related Art

A user interface (UI) utilizing speech recognition or speech synthesis can be applied to equipment such as car navigation systems. Speech recognition generally is accompanied by the problem of misrecognition. Although there are various causes of misrecognition, such as background noise, often the fact that the way a user makes an utterance is inappropriate can lead to misrecognition. For example, if the timing of start of an utterance is too early, the beginning of input speech may be lost. There are also occasions where an utterance is too loud or too soft. A method whereby a system advises the user of the appropriate method of utterance is conceivable as a method of reducing misrecognition due to an inappropriate utterance. In other words, according to this method, the cause of an inappropriate utterance is determined from the input speech of the user and the user is given advice at the proper timing so as to correct for the cause.

U.S. Pat. No. 6,336,091 discloses a technique for analyzing input speech and classifying the speech as to whether the start of an utterance is too early or whether the voice is too loud or too soft.

Although U.S. Pat. No. 6,336,091 discloses a method of determining the cause of an inappropriate utterance from the input speech of the user, it is silent with regard to an interactive method of advising the user based upon the determination.

A problem that arises with the giving of advice to a user is the timing of the advice. Assume that some inappropriate factor, e.g., a voice that is too loud, can be specified from the input speech of a user. A conceivable method of dealing with this is to immediately issue the advice "Your voice is too loud; speak a little more softly" or "Adjust microphone sensitivity". However, speech recognition applied to this input speech will not necessarily result in misrecognition. A problem is that in a case where speech is recognized correctly and the device can be operated correctly, the user will be confused if the above-mentioned advice is given.

SUMMARY OF THE INVENTION

In view of the above problems in the conventional art, the present invention has an object to provide an information processing apparatus and method whereby advice having appropriate content can be given at an appropriate timing with regard to a method of user utterance.

In one aspect of the present invention, an information processing apparatus includes an analysis unit configured to analyze the suitability of input speech for speech recognition, a speech recognition unit configured to perform the speech recognition to the input speech, a decision unit configured to decide processing that corresponds to result of the speech recognition, an acceptance unit configured to accept a cancel instruction that cancels execution of the processing decided by the decision unit, and an output unit configured to output guidance relating to the input speech based upon result of analysis by the analysis unit if the cancel instruction is accepted by the acceptance unit.

Further features of the present invention will become apparent from the following description of exemplary embodiments with reference to the attached drawings.

DESCRIPTION OF THE EMBODIMENTS

Various exemplary embodiments, features and aspects of the present invention will be described in detail below with reference to the drawings.

First Embodiment

Figure 4:
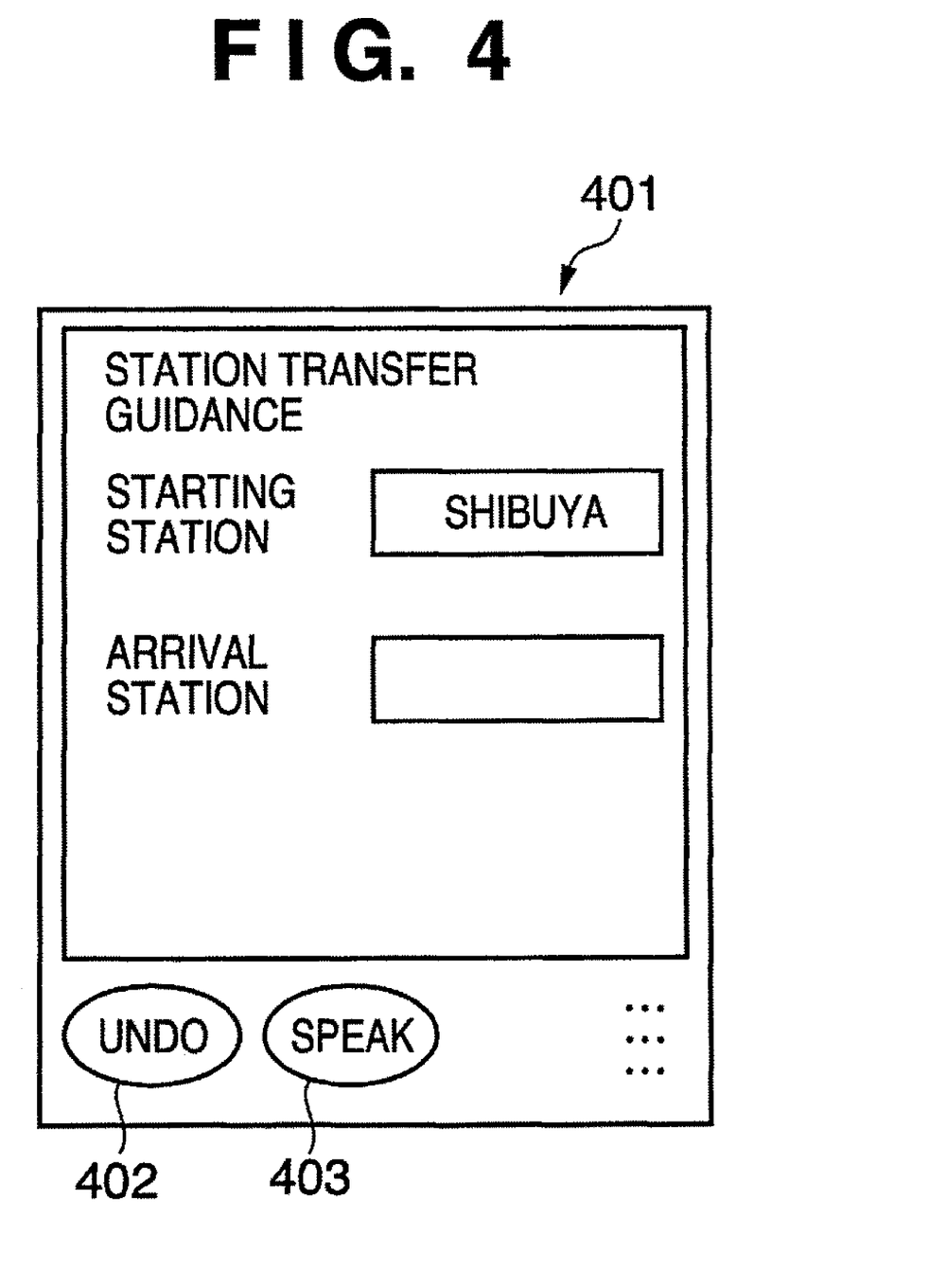
FIG. 4 is a diagram illustrating an example of a screen display based upon a station-transfer guidance application of a mobile terminal according to an embodiment of the present invention.

Described in this embodiment is a case where an application that provides guidance for transferring at a train station is operated by voice. The application is executed by a mobile terminal 401 serving as an information processing apparatus illustrated in FIG. 4. Here the user is attempting to make inputs to "STARTING STATION" and "ARRIVAL STATION" fields that are being displayed on the screen of the mobile station 401. The inputs to these fields can be made by voice. While pressing a speech input button 403, the user utters "SHIBUYA", for example, to make an input. The utterance undergoes speech recognition, and the result of recognition is displayed in the fields. By pressing an undo button 402, the user can cancel the input. For example, in the event that an unintended station name is displayed in a field by erroneous speech recognition, this field is made blank or returns to the last displayed station name if the undo button 402 is pressed.

Figure 1:
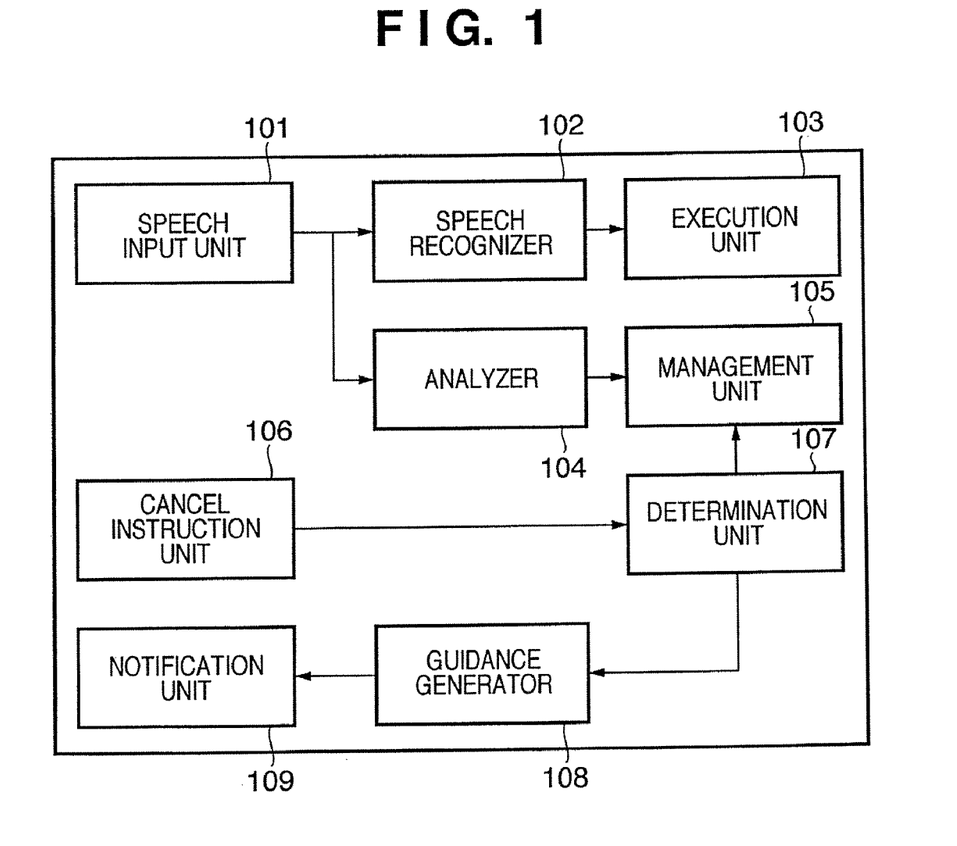
FIG. 1 is a block diagram illustrating the functional configuration of a mobile terminal according to an embodiment of the present invention.

FIG. 1 is a block diagram illustrating the functional configuration of the mobile terminal 401 according to this embodiment. The mobile station 401 includes a speech input unit 101; a speech recognizer 102 which, in this embodiment, executes speech recognition in which station names are the words that undergo recognition; and an execution unit 103 for deciding processing based upon the result of speech recognition and for executing the processing decided. In this embodiment, the execution unit 103 executes processing for displaying the name of a station, which is the result of speech recognition, in the prescribed field.

The mobile station 401 further includes an analyzer 104 for analyzing speech that is input from the speech input unit 101; a management unit 105 for managing the result of analysis by the analyzer 104; a cancel instruction unit 106; a determination unit 107 which, in a case where the user has issued an execution-cancel instruction through the cancel instruction unit 106, determines whether to provide the user with guidance concerning a method of making an utterance; a guidance generator 108; and a notification unit 109.

Figure 2:
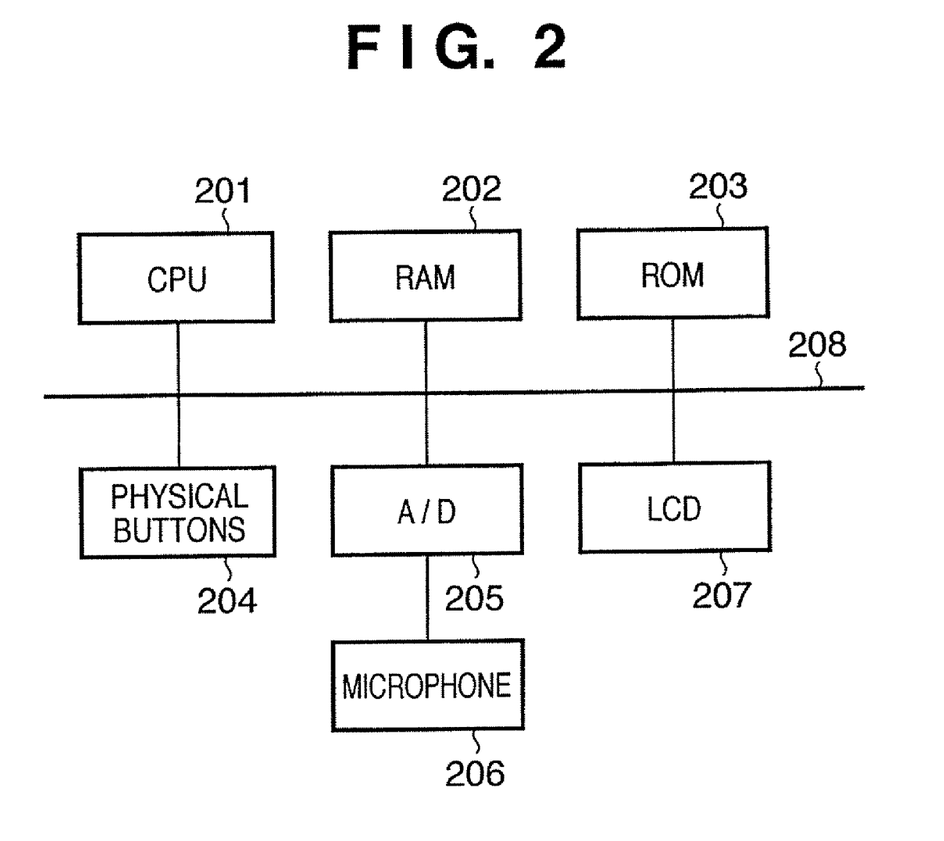
FIG. 2 is a diagram illustrating the hardware implementation of a mobile terminal according to an embodiment of the present invention.

FIG. 2 is a block diagram illustrating the hardware implementation of the mobile terminal 401 according to this embodiment. In FIG. 2, a CPU 201 operates in accordance with a program that implements an operating procedure described below. A RAM 202 provides a storage area necessary for the operation of the CPU 201. A ROM 203 stores a program, etc., for implementing the operating procedure described below. Physical buttons 204 include the speech input button 403 and undo button 402 shown in FIG. 4. A microphone 206 issues an electroacoustic signal that is converted to a digital signal by an A/D converter 205. The mobile station 401 further includes a liquid crystal display (LCD) screen 207 and a bus 208.

Figure 3:
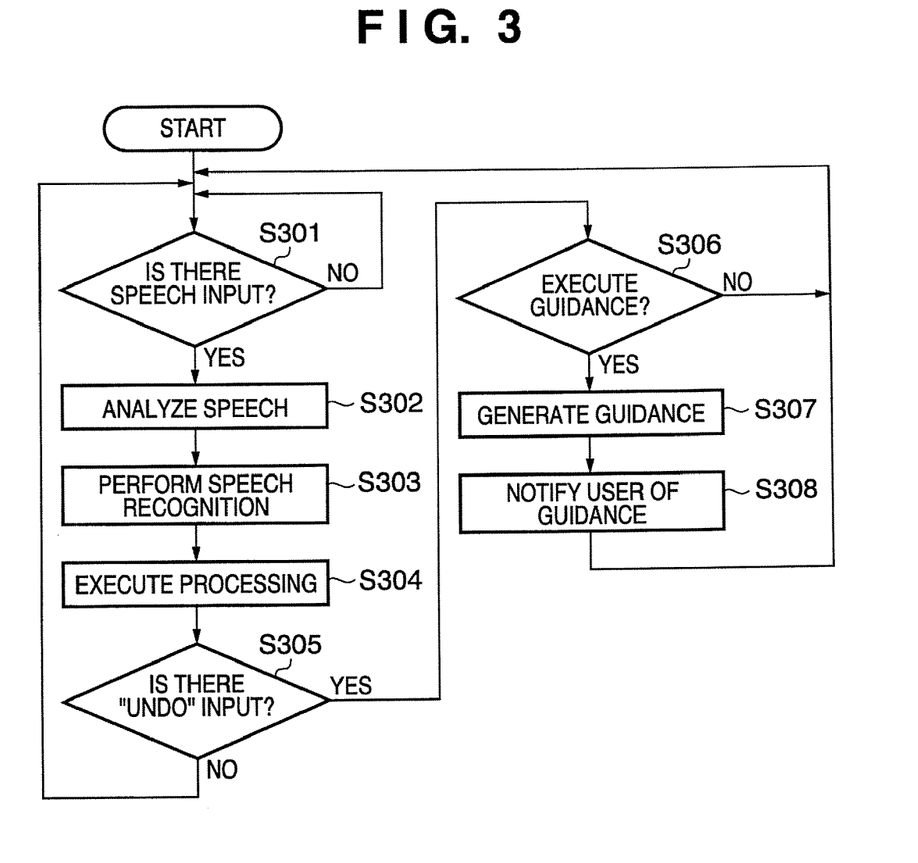
FIG. 3 is a flowchart for describing the operation of a mobile terminal according to an embodiment of the present invention.

Next, the operation of this embodiment will be described in accordance with the flowchart of FIG. 3. The program corresponding to this flowchart has been stored in the ROM 203. After the mobile station 401 is started up, the program is loaded into the RAM 202 and executed by the CPU 201.

First, monitoring is performed to determine whether speech has been input via the microphone 206 (S301). If speech has been input, the analyzer 104 analyzes the suitability of the input speech for speech recognition (S302). Specifically, the analyzer 104 determines to which of the following five categories the input speech corresponds:

(1) utterance timing is too early (speaking starts before the speech input button 403 is pressed);
(2) the speech input button 403 is released to soon;
(3) the voice is too loud;
(4) the voice is too soft; and
(5) none of the above.

The result of this determination is recorded in the management unit 105. Next, the speech recognizer 102 recognizes the input speech (S303), and the execution unit 103 decides the processing that conforms to the result of this recognition and executes this processing (S304). In this embodiment, execution of the processing means displaying the station name, which is the result of recognition processing, in the prescribed field. Accordingly, a check is made to determine whether the user has pressed the undo button 402 (S305). If the undo button 402 has been pressed, there is a possibility that the result of speech recognition is erroneous. Since there is the possibility that the cause of erroneous speech recognition is the method of utterance by the user, the determination unit 107 determines whether guidance concerning user utterance is to be communicated to the user (S306). This determination makes use of the result of input speech analysis that has been recorded in the management unit 105. If the result of analysis is "none of the above" mentioned in (5) above, it is construed that the method of utterance by the user is free of any problem and therefore it is decided not to provide guidance. If the result of analysis is any one of the categories (1) to (4), on the other hand, then the determination unit 107 determines that the corresponding guidance is to be provided. The guidance is generated by the guidance generator 108 in accordance with the categories (1) to (4) of the results of analysis (S307). For example, in a case where the analytical result is "utterance timing is too early", which is category (1), the following guidance is generated: "You started speaking too early. Speak after pressing the SPEAK button." The notification unit 109 then notifies the user of the guidance thus generated (S308). In the example described in this embodiment, the guidance generator 108 generates guidance after it is determined that guidance is to be provided at S306. However, this does not impose a limitation upon the present invention. It may be so arranged that different types of guidance are generated and stored beforehand, a type of guidance is selected from among the stored types of guidance after it is determined that guidance is to be given, and the selected guidance is reported to the user. In this case, the guidance generator 108 would be a guidance selector and the generation of guidance (S307) would become the selection of guidance.

Figure 5A:
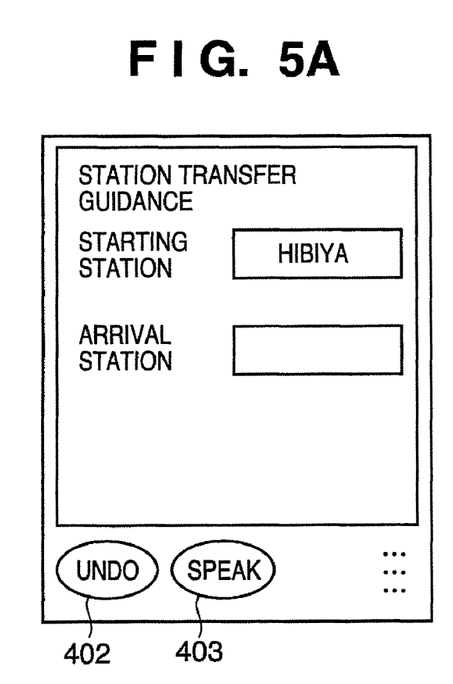
FIGS. 5A and 5B are diagrams respectively illustrating examples of a speech input to a mobile terminal and display of guidance on the mobile terminal according to an embodiment of the present invention.
Figure 5B:
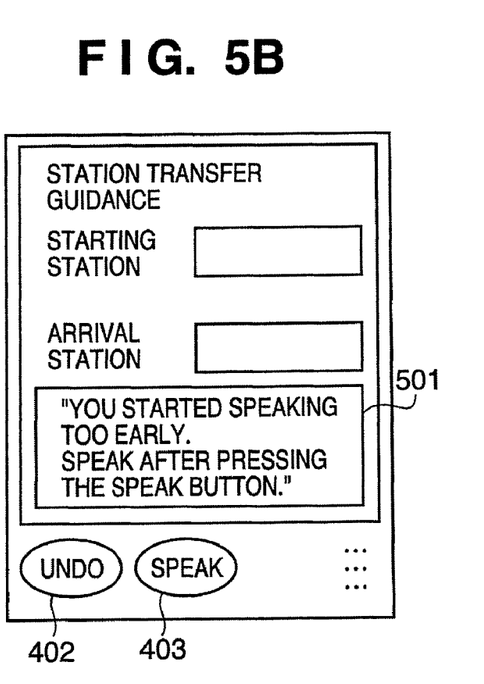

An example is shown in FIGS. 5A and 5B. FIG. 5A illustrates an example in which the user has uttered "Shibuya" but this has been recognized erroneously as "Hibiya" and this result has been displayed in the corresponding field. FIG. 5B illustrates a state attained after the user presses the undo button 402 upon viewing this display. Thus, the display of the result of recognition is cancelled, the field is restored to the blank state and guidance 501 conforming to the result of utterance analysis is displayed.

Thus, as described above, the user can obtain advice having the appropriate content with regard to the method of utterance, and the probability of subsequent misrecognition due to the method of utterance can be reduced. Since this advice is presented at the timing at which the undo button 402 is pressed, there is diminished possibility that the user will be confused by being given unnecessary advice at a timing not desired by the user.

Second Embodiment

In the first embodiment described above, the user is provided with guidance relating to utterance in accordance with the analytical result whenever input speech is analyzed by the analyzer 104. However, it may be so arranged that guidance is provided only in a case where such an analytical result is detected in excess of a fixed number of times, e.g., five times or more.

Figure 6:
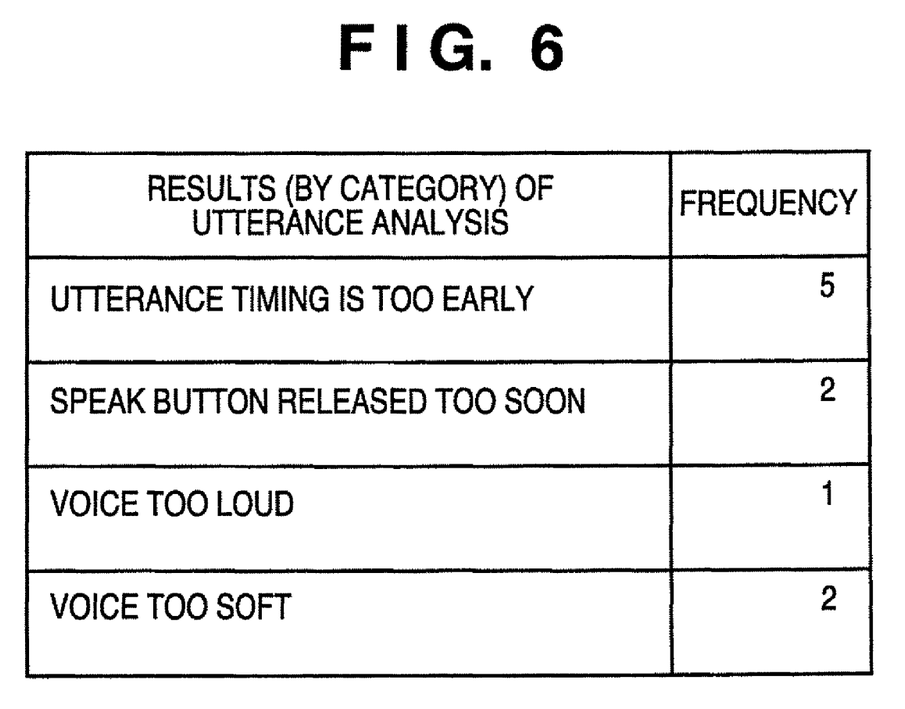
FIG. 6 is a diagram illustrating an example of a frequency table according to an embodiment of the present invention.

For example, the management unit 105 stores a frequency table having a structure of the kind shown in FIG. 6 and manages the frequency of occurrence of results of utterance analysis on a per-cause basis. The example of FIG. 6 indicates that the utterance corresponding to "utterance timing is too early" of category (1) occurred five times, by way of example. Here "utterance timing is too early" is found to be the result of analyzing the speech input of the user and it is decided that execution conforming to speech recognition is to be cancelled. Since the frequency of occurrence of "utterance timing is too early" is equal to or greater than the threshold value "5", the determination unit 107 determines that guidance is to be reported to the user. On the other hand, if the factor found by analysis is "the voice is too loud" of category (3), then the frequency of occurrence of this utterance is "1" according to the example of FIG. 6. Accordingly, the determination unit 107 determines that guidance is not to be reported to the user and guidance is not given.

By adopting this arrangement, the trait of user utterances can be detected more reliably and more appropriate advice can be given.

Third Embodiment

The second embodiment described above manages the frequency of occurrence of causes according to each cause obtained as result of analysis. However, it may be so arranged that the number of times a cancel instruction is issued by pressing the undo button 402 is managed independently of the cause and guidance is reported to the user if the number of times exceeds a fixed number of times.

Fourth Embodiment

The foregoing embodiments illustrate an example in which an instruction to cancel a speech input is entered by pressing the undo button 402, which is one of the physical buttons 204. However, it will be understood by those skilled in the art that the means for inputting the cancel instruction is not limited to a physical button. For example, it may be so arranged that the cancel instruction is input by an input of handwriting indicative of "cancel" using a pen or stylus, or it is possible to adopt an arrangement in which the cancel instruction is input as by uttering "cancel" by voice.

Fifth Embodiment

Figure 7A:
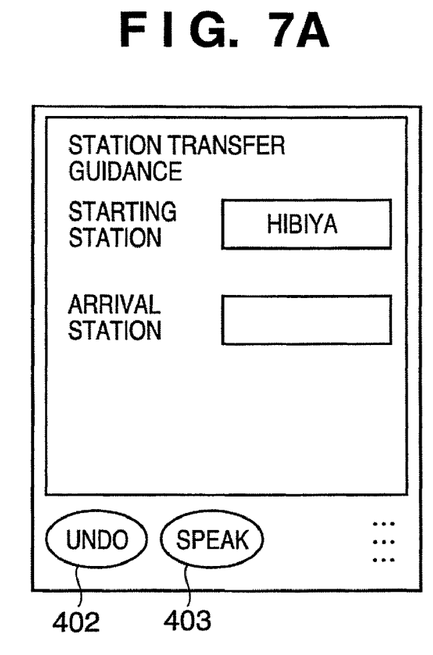
FIGS. 7A and 7B are diagrams respectively illustrating examples of a speech input to a mobile terminal and display of guidance on the mobile terminal according to an embodiment of the present invention.
Figure 7B:
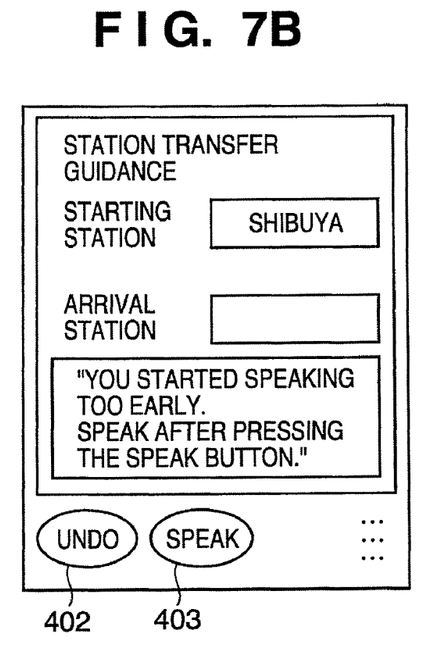

It is also possible to introduce a non-explicit cancel instruction. This will be described with reference to the example of FIGS. 7A and 7B. FIG. 7A illustrates an example in which the user has uttered "Shibuya" but this has been recognized erroneously as "Hibiya" and this result has been displayed in the "starting station" field. Here it may be so arranged that if the user again utters "Shibuya" to thereby make an input to the same field, this is regarded as indicating cancellation of the initial result of recognition, a guidance determination is performed as in the manner of the foregoing embodiments and guidance is reported to the user if guidance is required (see FIG. 7B).

Sixth Embodiment

In the foregoing embodiments, the results of analyzing input speech are placed in four categories of causes, as illustrated in FIG. 6. However, classification into causes other than these is permissible. For example, "background noise is too loud" may be detected as a cause. If this cause is detected, then the following guidance may be provided: "Background noise is too loud. Speak in a quieter environment or use input means other than speech."

Seventh Embodiment

Figure 8A:
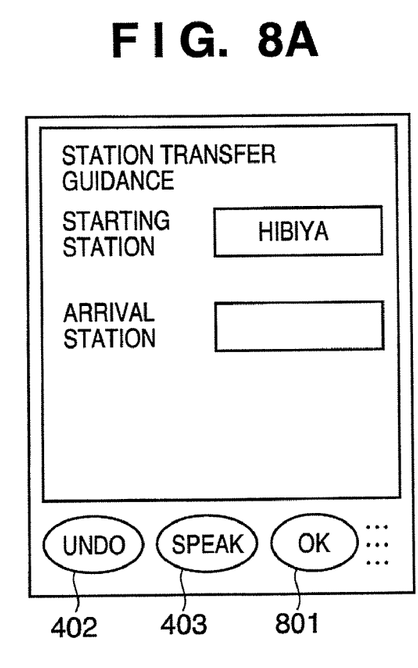
FIGS. 8A and 8B are diagrams respectively illustrating examples of a speech input to a mobile terminal and display of a message confirming whether or not there is need for display of guidance on the mobile terminal according to an embodiment of the present invention.
Figure 8B:
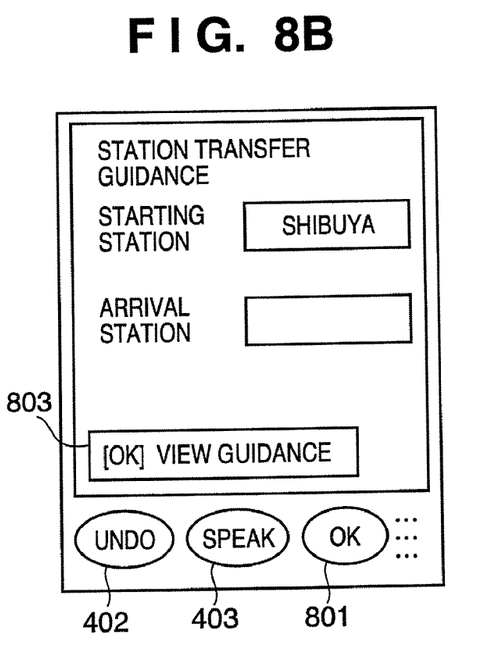

In the foregoing embodiments, guidance is generated and reported to the user unconditionally if the determination unit 107 has determined that guidance is to be given. However, it may be so arranged that the user confirms whether guidance is necessary and guidance is reported to the user if the user instructs that the guidance is required. This will be described with reference to the example of FIGS. 8A and 8B. For example, as illustrated in FIGS. 8A and 8B, an OK button 801 for confirming guidance is provided in addition to the undo button 402 and speech input button 403. Assume now that the user has uttered "Shibuya" but that this has been recognized erroneously as "Hibiya" and this result displayed in the "starting station" field (see FIG. 8A). If the determination unit 107 determines that guidance is to be given, the corresponding guidance is not displayed immediately. Rather, a display indicating the existence of guidance is displayed temporarily, as indicated at 803 in FIG. 8B, whereby confirmation as to whether guidance is required or not is sought from the user. The guidance is displayed if the OK button 801 is pressed.

Eighth Embodiment

In the foregoing embodiments, the invention is described taking as an example the output of guidance in a case where processing that has been executed by the execution unit 103 is cancelled. However, the present invention is not limited to this arrangement. It may be so arranged that processing corresponding to the result of speech recognition is decided, the user is queried as to whether the decided processing should be executed or not, and guidance is output if a response to the effect that the processing should not be executed is obtained from the user.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-303380, filed Nov. 8, 2006, which is hereby incorporated by reference herein in its entirety.

What is claimed is:

1. An information processing apparatus comprising:
at least one processor programmed to control:
an analysis unit configured to analyze the suitability of input speech for speech recognition;
a speech recognition unit configured to perform the speech recognition to the input speech;
a display control unit configured to display a result of the speech recognition on a display unit;
an acceptance unit configured to accept a user's operation for canceling the display of the result of the speech recognition; and
an output unit configured to output a guidance message relating to the input speech based upon result of analysis by said analysis unit if the user's operation is accepted by said acceptance unit.

2. The apparatus according to claim 1, further comprising a storage unit configured to store, according to a category of the suitability, a frequency at which the user's operation has been accepted;
wherein said output unit outputs the guidance message if the frequency exceeds a predetermined value.

3. An information processing method comprising:
using at least one processor to perform the following:
analyzing the suitability of input speech for speech recognition;
performing the speech recognition to the input speech;
displaying a result of the speech recognition on a display unit;
accepting a user's operation for canceling the display of the result of the speech recognition; and
outputting a guidance message relating to the input speech based upon the analysis result if the user's operation is accepted.

4. A non-transitory computer-readable storage medium having stored thereon a computer program, said program comprising code for performing the following steps:
analyzing the suitability of input speech for speech recognition;
performing the speech recognition to input speech;
displaying a result of the speech recognition on a display unit;
accepting a user's operation for canceling the display of the result of the speech recognition; and
outputting a guidance message relating to the input speech based upon the analysis result if the user's operation is accepted.

* * * * *